United States Patent [19]

Brugel

[11] Patent Number: 5,242,988
[45] Date of Patent: Sep. 7, 1993

[54] PROCESS FOR CHLORINATION AND CHLOROSULFONATION OF OLEFIN POLYMERS IN THE PRESENCE OF FLUORINATED SURFACTANTS

[75] Inventor: Edward G. Brugel, Wilmington, Del.

[73] Assignee: E. I. Du Pont de Nemours and Company, Wilmington, Del.

[21] Appl. No.: 13,856

[22] Filed: Feb. 5, 1993

[51] Int. Cl.⁵ ............................................. C08F 8/22
[52] U.S. Cl. .............................. 525/354; 525/333.9; 525/334.1; 525/356
[58] Field of Search .................................. 525/354, 356

[56] References Cited

U.S. PATENT DOCUMENTS

| | | |
|---|---|---|
| T917,004 | 12/1973 | Young et al. |
| 2,537,611 | 1/1951 | Bartovics ........................ 525/356 |
| 3,542,747 | 11/1970 | Ennis et al. ..................... 525/356 |
| 4,602,068 | 7/1986 | Bronstert ........................ 525/356 |

FOREIGN PATENT DOCUMENTS

| | | |
|---|---|---|
| 834905 | 5/1960 | United Kingdom. |
| 1325579 | 8/1973 | United Kingdom. |

Primary Examiner—Bernard Lipman
Attorney, Agent, or Firm—Marilyn H. Bromels

[57] ABSTRACT

Polymer agglomeration is prevented in chlorinations and chlorosulfonations of olefin polymers performed in perfluorinated media by addition of fluorinated surfactants.

11 Claims, No Drawings

PROCESS FOR CHLORINATION AND CHLOROSULFONATION OF OLEFIN POLYMERS IN THE PRESENCE OF FLUORINATED SURFACTANTS

BACKGROUND OF THE INVENTION

This invention relates to chlorination or chlorosulfonation of olefin polymers. In particular, this invention relates to a process for preparation of chlorinated or chlorosulfonated olefin polymers in suspension in perfluorinated alkane, perfluorinated ether, or perfluorinated trialkyl amine media in the presence of fluorinated surfactants.

Chlorinated and chlorosulfonated olefin homopolymers and copolymers are well-known compositions useful as elastomers, coatings, adhesives, and inks. The chlorinated polymers are prepared on a commercial scale by reaction of chlorine with olefin polymers in either solution or aqueous suspension, while the chlorosulfonated analogues are prepared by reaction of olefin polymers with chlorine and sulfuryl chloride or sulfur dioxide in solution. Reactive extrusion and solventless processes have also been disclosed, for example in U.S. Pat. No. 3,347,835 and in U.S. Pat. No. 4,554,326. In addition, chlorination and chlorosulfonation of solvent-swollen ethylene polymers in fluids consisting of fluorocarbons having 1-4 carbon atoms has been disclosed in British Patent 1,325,579.

Each of these prior art processes has disadvantages. Specifically, solution processes require large volumes of organic solvents, generally chlorinated solvents such as carbon tetrachloride, which must be recovered and recycled. In addition, many chlorinated solvents are not inert to further chlorination. This leads to production of unwanted byproducts which must be removed. For example, hydrofluorocarbon solvents undergo appreciable chlorination resulting in the production of undesirable chlorofluorocarbons. In addition, due to the environmental hazards associated with these halogenated materials, stringent control of emissions and substantial investments in pollution control equipment are necessary. Aqueous suspension processes, on the other hand, cannot be used for preparation of chlorosulfonated olefin polymers. Further, chlorinations in aqueous suspension produce non-homogeneously chlorinated products. Reactive extrusion processes are not attractive because they are either limited to production of compositions containing low levels of chlorine, e.g. as disclosed in U.S. Pat. No. 4,554,326, or they are not adaptable for use on a commercial scale without major modification, see for example U.S. Pat. No. 3,347,835. Solventless processes are also not adapted to commercial scale exploitation. Finally, the process disclosed in British Patent 1,325,579, wherein fluorocarbon-swollen ethylene polymers are chlorinated or chlorosulfonated is unsuitable for preparation of a significant number of chlorinated ethylene copolymer resin types, in particular copolymers of vinyl acetate and methacrylic acid, because the surface tack of these polymers causes severe agglomeration during chlorination. In addition, these materials dissolve a portion of the chlorinated resin products resulting in sticky particle surfaces and necessitating additional isolation steps.

A slurry process which overcomes many of these disadvantages is disclosed in copending U.S. patent application Ser. No. 010,966, filed on Jan. 29, 1993 in the name of Edward Gus Brugel, entitled "Process for Chlorination and Chlorosulfonation of Olefin Polymers in the Presence of Fluorinated Surfactants", wherein the use of perfluorinated higher alkanes, perfluorinated ethers, and perfluorinated amines as reaction media for chlorination and chlorosulfonation of olefin polymers is described. Although this process eliminates use of undesirable chlorinated solvents, it too has its drawbacks. In particular, the process is not suitable for chlorination or chlorosulfonation of low molecular weight olefin polymers, i.e. those having weight average molecular weights below 10,000. Such polymers are tacky and tend to agglomerate which results in production of non-homogeneously chlorinated resins. In addition, in those cases wherein the chlorination is performed at temperatures above the softening temperature of the olefin polymers agglomeration often occurs.

It has now been found that polymer agglomeration can be substantially eliminated in chlorinations and chlorosulfonations conducted in perfluorinated liquid media if the processes are performed in the presence of fluorinated surfactants. This allows the slurry process to be extended to preparation of a broader spectrum of chlorinated and chlorosulfonated olefin polymers and permits more efficient production of these polymers under a wider range of reaction conditions than was formerly possible.

SUMMARY OF THE INVENTION

The present invention is directed to an improved method for producing chlorinated olefin polymers in perfluorinated liquids. More specifically the present invention is directed to a process for the preparation of chlorinated olefin polymers which comprises a) suspending an olefin polymer selected from the group consisting of homopolymers and copolymers of $C_2$–$C_8$ alpha-monoolefins in a liquid medium substantially inert to chlorination which has a boiling point of 25°–250° C. and in which the olefin polymer and the chlorinated olefin polymer are substantially insoluble, said liquid medium being selected from the group consisting of i) perfluorinated $C_6$–$C_{20}$ aliphatic and cycloaliphatic alkanes, ii) perfluorinated $C_3$–$C_{15}$ aliphatic and cycloaliphatic ethers, and iii) aliphatic and cycloaliphatic perfluorinated tertiary alkyl amines of the formula

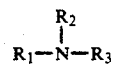

wherein $R_1$, $R_2$, and $R_3$ are independently perfluorinated alkyl groups having 3–12 carbon atoms, and $R_1$ and $R_2$ may be joined to form a cycloaliphatic ring wherein 0–3 methylene groups of the cycloaliphatic ring are replaced by moieties selected from the group consisting of oxo, sulfo, and perfluoroalkylamino, said liquid medium containing at least about 0.1 parts by weight, per 100 parts by weight olefin polymer, of a fluorinated surfactant having a fluorine content of at least about 20 percent by weight, b) introducing a chlorinating agent to the suspension in the presence of a free radical catalyst, and c) chlorinating the olefin polymer to produce a substantially non-agglomerating chlorinated olefin polymer resin.

In a preferred embodiment of the process of the present invention the chlorinating agent is a chlorosulfonating agent, for example a mixture of elemental chlorine and sulfur dioxide or sulfuryl chloride, which results in the introduction of chlorosulfonyl moieties concomitantly with chlorination of the olefin resin.

DETAILED DESCRIPTION OF THE INVENTION

A wide variety of olefin polymers may be chlorinated or chlorosulfonated according to the process of the present invention. By olefin polymers is meant homopolymers and copolymers of $C_2$-$C_8$ alpha-monoolefins, including graft copolymers. Particularly useful examples include homopolymers of $C_2$-$C_3$ alpha monoolefins, copolymers of ethylene and carbon monoxide, and copolymers of ethylene and at least one ethylenically unsaturated monomer selected from the group consisting of $C_3$-$C_{10}$ alpha monoolefins, $C_1$-$C_{12}$ alkyl esters of unsaturated $C_3$-$C_{20}$ monocarboxylic acids, unsaturated $C_3$-$C_{20}$ mono- or dicarboxylic acids, anhydrides of unsaturated $C_4$-$C_8$ dicarboxylic acids, and vinyl esters of saturated $C_2$-$C_{18}$ carboxylic acids. Specific examples of such polymers include polyethylene, polypropylene, ethylene vinyl acetate copolymers, ethylene acrylic acid copolymers, ethylene methacrylic acid copolymers, ethylene methyl acrylate copolymers, ethylene methyl methacrylate copolymers, ethylene n-butyl methacrylate copolymers, ethylene glycidyl methacrylate copolymers, graft copolymers of ethylene and maleic anhydride, graft copolymers of propylene and maleic anhydride, and copolymers of ethylene with propylene, butene, 3-methyl-1-pentene, or octene. The copolymers may be dipolymers, terpolymers, or higher order copolymers. Preferred olefin polymers are polyethylene, copolymers of ethylene and vinyl acetate, copolymers of ethylene and acrylic acid, and copolymers of ethylene and methacrylic acid. Weight average molecular weights of the olefin polymers may range from about 1,000 to 300,000, and are preferably 2,000-150,000, most preferably 2,000-60,000.

The suspension media in which the chlorinations or chlorosulfonations are performed are perfluorinated liquids substantially inert to chlorination having boiling points between about 25° C. and about 250° C. The particular perfluorinated compounds which are suitable for use as reaction media in the process of the present invention belong to three generic classes. The first of these includes linear or branched aliphatic or cycloaliphatic perfluorinated alkanes containing 6-20 carbon atoms. Specific examples of such compounds include perfluorohexane, perfluoroheptane, perfluorooctane, perfluoroisooctane, perfluorodecane, and perfluorododecane. The alkanes must contain at least six carbon atoms to eliminate solvent swelling of the olefin polymers. Lower alkanes swell the olefin polymer particle surfaces which results in development of excessive surface tack and resultant particle agglomeration. Chlorination then primarily takes place only on the surfaces leading to a non-homogeneous product.

The second class of perfluorinated compounds includes aliphatic or cycloaliphatic perfluorinated ethers which contain 3-15 carbon atoms. Specific examples include perfluorinated dibutyl ether, perfluorinated 2-butyltetrahydrofuran, and perfluorohexylisobutyl ether.

Included in the third class of perfluorinated compounds are perfluorinated aliphatic or cycloaliphatic tertiary alkyl amines having alkyl groups of 3-12 carbon atoms. The amino group may be bonded to three linear or branched alkyl groups. In addition, two of the alkyl groups may be joined to form a cycloaliphatic ring. Optionally, 1-3 of the methylene groups of the cycloaliphatic ring may be replaced by oxo, sulfo, or perfluoroalkylamino groups. Specific examples of the perfluorinated amines include perfluorotri-n-propylamine, perfluorotriisopropylamine, perfluorotri-n-butylamine, perfluorotriamylamine, perfluorodibutylpropylamine, perfluoro-N-methylmorpholine, perfluoro-N-ethylmorpholine, and perfluoro-N-methylpyrrolidine.

According to the process of the present invention a fluorinated surfactant is present in the olefin polymer/perfluorinated liquid suspension in an amount of at least about 0.1 parts by weight per 100 parts olefin polymer. The presence of this component mitigates the tendency toward agglomeration of the olefin polymer particles, particularly of low molecular weight waxy olefin polymers and low molecular weight ethylene copolymers, i.e. those polymers having weight average molecular weights below 10,000. Such compositions have tacky surfaces and tend to agglomerate severely in the absence of the fluorinated surfactant. The surfactant is also beneficial in chlorinations and chlorosulfonations of higher molecular weight olefin polymers because it allows production of chlorinated products having a full range of crystallinity and chlorine content. Further, the surfactant prevents polymer agglomeration when the chlorination or chlorosulfonation process is conducted at temperatures above the softening point of the olefin polymer.

At least 0.1 part of fluorinated surfactant per 100 parts olefin polymer, preferably 1-10 parts, most preferably 2-6 parts, should be present in the reaction mixture. Amounts less than 0.1 part are insufficient to reduce surface tack of the lower molecular weight olefin polymers while use of quantities above 10 percent by weight causes undesirable effects on the properties of the product.

The fluorinated surfactants useful in the practice of the present invention may be of the cationic, anionic, amphoteric, or non-ionic type and contain fluorinated linear or branched chain alkylene groups. Particularly preferred are those compositions of the formula $R_fE$, where $R_f$ represents a 2-18 carbon linear or branched chain fluoroalkyl or perfluoroalkyl group and E represents a linear or branched chain alkylene group of 2-20 carbon atoms. Included among the preferred fluorosurfactants are those compositions of the formula $R_fE$ wherein from 1-4 of the methylene or methine groups present in the alkylene chain of the E group are replaced by moieties selected from the group consisting of oxo, sulfo, $SO_2$, $SO_3$, carbonyl, ethoxy, propoxy, PO, $PO_2$, OPO, $C_1$-$C_{12}$ alkylamino, or $C_1$-$C_{12}$ dialkylamino groups. Specific examples of these preferred compositions include perfluoroalkylethyl stearates, perfluoroalkylethyl polyethylene oxides, perfluoroalkylethyl phosphates, and perfluoroalkylethyl sulfonates wherein the perfluoroalkyl group is $F(CF_2CF_2)_{3-8}$. The fluorinated surfactants should contain at least about 20 weight percent fluorine. Surfactants having lower degrees of fluorination do not reduce surface tack of the entire range of olefin polymers contemplated by the invention.

According to the process of the present invention chlorine or a chlorine-generating agent is introduced to an agitated suspension of an olefin polymer in one of the above-described perfluorinated liquid suspension media in the presence of a fluorinated surfactant. The additional presence of sulfur dioxide or a chlorosulfonating agent, such as a mixture of sulfur dioxide and sulfuryl chloride, or sulfuryl chloride alone, will result in incorporation of sulfonyl chloride moieties along the polymer backbone. Chlorination or chlorosulfonation then proceeds until the desired level of chlorine and sulfur has been incorporated. The resultant chlorinated or chlorosulfonated olefin polymers are substantially non-agglomerating. Products containing any desired level of chlorine, up to the theoretical maximum, may be produced using the process of the present invention. However, chlorinated polymers having 20-70 wt. % combined chlorine are of the greatest commercial interest for applications as elastomers, coatings, adhesives, and inks. If the olefin polymer is chlorosulfonated sulfur may be introduced up to a level of about 6 wt. %, but preferably 1-3 wt. % sulfur is usually introduced because it assures the highest degree of thermal stability.

The chlorination or chlorosulfonation reaction may be performed continuously or in a batch-wise manner at temperatures of about 50°-220° C., preferably 100°-120° C., at atmospheric pressure or at elevated pressures of 0.01-0.50 MPa. Conventional free radical initiators, such as organic peroxides or azo compounds, are generally used, for example ditertiarybutyl peroxide, 2,2'-azobis[2-methylpropanenitrile] or other compounds of comparable free radical activity. The presence of light, especially ultraviolet light, can also act as a free radical initiator.

After the desired degree of chlorination or chlorosulfonation has occurred the reaction is terminated by stopping the flow of chlorinating or chlorosulfonating agent. A stabilizer, generally an epoxidized phenol such as the condensation product of two moles of epichlorohydrin with the mole of propane-2,2-bisphenol, is added and the product is isolated, for example, by filtration, or extrusion. When isolation is accomplished by filtration, the polymer product can be freed from residual perfluorinated liquid by washing with a solvent in which the perfluorinated liquid is soluble, but in which the polymer is substantially insoluble. When the isolation method is extrusion, the reaction mixture may be preconcentrated by filtration, decantation, devolatilization, or evaporation prior to introduction into the feed section of a devolatilizing extruder.

The following examples, wherein all percentages are by weight unless otherwise stated, illustrate several preferred embodiments of the present invention.

EXAMPLES

Example 1

A 400 ml resin kettle was charged with 100 ml Fluorinert ®FC-77 perfluorinated liquid (a mixture of perfluorinated $C_8$ alkanes having a boiling point 97° C. and a density of 1.65 g/cc), 10 g ethylene vinyl acetate copolymer (14 wt. % vinyl acetate, $M_w$ 60,000), 0.75 g of a fluorinated surfactant (ZONYL ® FTS fluorosurfactant, a perfluoroalkylethyl stearate) and 0.030 g azobisisobutyronitrile initiator. The reaction mixture was heated to 60° C. and chlorine gas was introduced at a rate of 0.46 g/minute. The temperature was maintained at 60° C. for two hours and then raised to 80° C. at a rate of 1° C./minute. After one hour at 80° C. the chlorine flow was discontinued and the reaction mixture was allowed to cool to room temperature. The free flowing, powdered product was isolated by filtration, washed twice with methanol, and dried under vacuum at 50° C. The chlorinated ethylene vinyl acetate product contained 40.7% chlorine.

Comparative Example 1

A 400 ml resin kettle was charged with 100 ml Fluorinert ®FC-77 perfluorinated liquid (a mixture of perfluorinated $C_8$ alkanes having a boiling point 97° C. and a density of 1.65 g/cc), 10 g ethylene vinyl acetate copolymer (14 wt. % vinyl acetate, $M_w$ 60,000), and 0.030 g azobisisobutyronitrile initiator. The reaction mixture was heated to 60° C. and chlorine gas was introduced at a rate of 0.46 g/minute. The temperature was maintained at 60° C. for two hours and then raised to 70° C. After approximately 20 minutes at 70° C. the polymer particles agglomerated and the reaction mixture was cooled to room temperature. The product was washed twice with methanol using a Waring blender and isolated by filtration. The product was dried under vacuum at 50° C. The product contained 16.63% chlorine and had a $T_g$ of $-15.58°$ C. The low chlorine content indicates that only the outer surface of the polymer powder had been chlorinated prior to agglomeration.

Example 2

A 400 ml resin kettle was charged with 100 ml Fluorinert ®FC-77 perfluorinated liquid (a mixture of perfluorinated $C_8$ alkanes having a boiling point 97° C. and a density of 1.65 g/cc), 10 g powdered polyethylene (density 0.92 g/cc, $M_w$ 2500, Brookfield viscosity 300 poise @ 140° C.), 0.5 g of a fluorinated surfactant, (ZONYL ®FTS fluorosurfactant, a perfluoroalkylethyl stearate) and 0.030 g azobisisobutyronitrile initiator. The reaction mixture was heated to 60° C. and chlorine gas was introduced at a rate of 0.46 g/minute. Additional initiator was added at a rate of 0.001 g/minute. The temperature was maintained at 60° C. for two hours and then raised to 80° C. at a rate of 1° C./minute. After one hour at 80° C. the chlorine flow was discontinued and the reaction mixture was allowed to cool to room temperature. The free flowing, powdered chlorinated polyethylene product was isolated by filtration, washed twice with methanol, and dried under vacuum at 50° C. The product contained 40.8% chlorine.

Comparative Example 2

A 400 ml resin kettle was charged with 100 ml Fluorinert ®FC-77 perfluorinated liquid (a mixture of perfluorinated $C_8$ alkanes having a boiling point 97° C. and a density of 1.65 g/cc), 10 g powdered polyethylene (density 0.92 g/cc, $M_w$ 2500, Brookfield viscosity 300 poise @ 140° C.), and 0.030 g azobisisobutyronitrile initiator. The reaction mixture was heated to 60° C. and chlorine gas was introduced at a rate of 0.46 g/minute. Additional initiator was added at a rate of 0.001 g/minute. The temperature was gradually increased at a rate of 1° C./minute. After 15 minutes the polymer had completely agglomerated. The chlorine gas flow was discontinued and the reaction mixture was cooled to room temperature. The polymer was combined with methanol, ground in a Waring Blender, and isolated by filtration. After being washed twice with methanol the polymer was dried under vacuum at 50° C. The product contained only 6.96% chlorine. This example illustrates that severe agglomeration of low molecular weight polymers occurs in the absence of fluorinated surfactants.

Example 3

Example 2 was repeated using the same procedure except that the powdered polyethylene starting material had a density of 0.92 g/cc and $M_w$ of 5,000 and the fluorinated surfactant of Example 2 was replaced with 0.5 g Zonyl ® FSO fluorosurfactant (a perfluoroalkylethoxylate surfactant). No agglomeration occurred during the reaction and the chlorinated polyethylene product was a free flowing powder which had a chlorine content of 41.4%.

Example 4

A 400 ml resin kettle was charged with 100 ml Fluorinert ®FC-40 perfluorinated liquid (perfluorinated tertiarybutylamine), 20 g powdered polyethylene (density 0.95 g/cc), 0.5 g of a fluorinated surfactant, (ZONYL ®FTS fluorosurfactant, a perfluoroalkylethyl stearate) and 0.030 g azobisisobutyronitrile initiator. The reaction mixture was heated to 120° C. and chlorine gas was introduced at a rate of 0.46 g/minute. Additional initiator was added at a rate of 0.001 g/minute. The temperature was maintained at 120° C. for four hours. After this time the chlorine flow was discontinued and the reaction mixture was allowed to cool to room temperature. The free flowing, powdered chlorinated polyethylene product was isolated by filtration and washed twice with methanol and dried under vacuum at 50° C. The product contained 27.6% chlorine.

Example 5

A 400 ml resin kettle was charged with 100 ml Fluorinert ®FC-7 perfluorinated liquid (a mixture of perfluorinated $C_8$ alkanes having a boiling point 97° C. and a density of 1.65 g/cc), 5 g powdered polyethylene (density 0.95 g/cc, $M_w$ 150,000), 0.5 g of a fluorinated surfactant, (ZONYL ®FTS fluorosurfactant, a perfluoroalkylethyl stearate), 3 ml sulfuryl chloride, and 0.030 g azobisisobutyronitrile initiator. The reaction mixture was heated to 60° C. and chlorine gas was introduced at a rate of 0.46 g/minute. Additional initiator was added at a rate of 0.001 g/minute. The temperature was gradually increased at a rate of 1° C./minute over a 3 hour time period to a final temperature of 90° C. After 4 hours total reaction time the chlorine flow was discontinued and the reaction mixture was allowed to cool to room temperature. The chlorosulfonated polyethylene product was isolated by filtration, washed twice with methanol, and dried under vacuum at 50° C. The product contained 24.47% chlorine and 0.91% sulfur.

Comparative Example 3

A 400 ml resin kettle was charged with 100 ml deionized water, 10 g powdered polyethylene (density 0.92 g/cc, $M_w$ 2500, Brookfield viscosity @140° C. 300 poise), 0.5 g of Merpol ® alkyl surfactant (an alcohol ethoxylate), and 0.030 g azobisisobutyronitrile initiator. The reaction mixture was heated to 60° C. and chlorine gas was introduced at a rate of 0.46 g/minute. Additional initiator was added at a rate of 0.001 g/minute. The temperature was maintained at 80° C. for one hour, after which time the polymer suspension had completely agglomerated. The reaction mixture was then cooled to room temperature. The partially chlorinated polymer was ground in a Waring blender containing methanol, filtered, and washed twice with fresh methanol. The product was dried in a vacuum oven at 50° C. The product contained 14.9% chlorine. This example illustrates that non-fluorinated surfactants do not prevent agglomeration in the production of chlorinated polyethylene of low molecular weight. It also illustrates that incorporation of chlorine into olefin polymers is diminished in chlorinations performed in perfluorinated liquids when non-fluorinated surfactants are used in place of fluorinated surfactants.

Comparative Example 4

A 400 ml resin kettle was charged with 100 ml deionized water, 10 g ethylene vinyl acetate copolymer (14 wt. % vinyl acetate, $M_w$ 60,000), 0.5 g of Merpol SE ® alkyl surfactant (an alcohol ethoxylate), and 0.030 g azobisisobutyronitrile initiator. The reaction mixture was heated to 60° C. and chlorine gas was introduced at a rate of 0.46 g/minute. The temperature was maintained at 60° C. for two hours, after which time the polymer suspension had completely agglomerated. The reaction mixture was then cooled to room temperature. The partially chlorinated polymer was ground in a Waring blender containing methanol, filtered, and washed twice with fresh methanol. The product was dried in a vacuum oven at 50° C. The product contained 31% chlorine. This example further illustrates that non-fluorinated surfactants do not prevent polymer agglomeration in the production of chlorinated ethylene vinyl acetate copolymers of low molecular weight. When compared to Example 1 it also illustrates that use of non-fluorinated solvents results in lower chlorine content in the product.

What is claimed is:

1. A process for the preparation of chlorinated olefin polymers which comprises
   a) suspending an olefin polymer selected from the group consisting of homopolymers and copolymers of $C_2$-$C_8$ alpha-monoolefins in a liquid medium substantially inert to chlorination which has a boiling point of 25°–250° C. and in which the olefin polymer and the chlorinated olefin polymer are substantially insoluble, said liquid medium being selected from the group consisting of i) perfluorinated $C_6$-$C_{20}$ aliphatic and cycloaliphatic alkanes, ii) perfluorinated $C_3$-$C_{15}$ aliphatic and cycloaliphatic ethers, and iii) aliphatic and cycloaliphatic perfluorinated tertiary alkyl amines of the formula

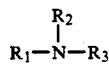

wherein $R_1$, $R_2$, and $R_3$ are independently perfluorinated alkyl groups having 3–12 carbon atoms, and $R_1$ and $R_2$ may be joined to form a cycloaliphatic ring wherein 0–3 methylene groups of the cycloaliphatic ring are replaced by moieties selected from the group consisting of oxo, sulfo, and perfluoroalkylamino, said liquid medium containing at least about 0.1 parts by weight, per 100 parts by weight olefin polymer, of a fluorinated surfactant having a fluorine content of at least about 20 percent by weight,
   b) introducing a chlorinating agent to the suspension in the presence of a free radical catalyst, and
   c) chlorinating the olefin polymer to produce a substantially non-agglomerating chlorinated olefin polymer resin.

2. The process of claim 1 wherein the chlorinating agent is a chlorosulfonating agent.

3. The process of claim 1 wherein the fluorinated surfactant is selected from the group consisting of compositions of the formula $R_f E$ where $R_f$ is a 2-18 carbon linear or branched chain fluoroalkyl or perfluoroalkyl group, and E is a linear or branched chain alkylene group of 2-20 carbon atoms wherein 1-4 of the methylene or methine groups present in the alkylene chain are replaced by moieties selected from the group consisting of oxo, sulfo, $SO_2$, $SO_3$, carbonyl, ethoxy, propoxy, PO, $PO_2$, OPO, $C_1$-$C_{12}$ alkylamino, and $C_1$-$C_{12}$ dialkylamino.

4. The process of claim 3 wherein $R_f$ is $F(CF_2CF_2)_x$, where x is 3-8.

5. The process of claim 1 wherein the olefin polymer is selected from the group consisting of homopolymers of $C_2$-$C_3$ alpha monoolefins, copolymers of ethylene and carbon monoxide, and copolymers of ethylene and at least one ethylenically unsaturated monomer selected from the group consisting of $C_3$-$C_{10}$ alpha monoolefins, $C_1$-$C_{12}$ alkyl esters of unsaturated $C_3$-$C_{20}$ monocarboxylic acids, unsaturated $C_3$-$C_{20}$ mono- or dicarboxylic acids, anhydrides of unsaturated $C_4$-$C_8$ dicarboxylic acids, and vinyl esters of saturated $C_2$-$C_{18}$ carboxylic acids.

6. The process of claim 1 wherein the olefin polymer is polyethylene.

7. The process of claim 1 wherein the olefin polymer is an ethylene vinyl acetate copolymer.

8. The process of claim 1 wherein the olefin polymer is a copolymer of ethylene and acrylic acid.

9. The process of claim 1 wherein the olefin polymer is a copolymer of ethylene and methacrylic acid.

10. The process of claim 1 wherein the weight average molecular weight of the olefin polymer is 2,000-60,000.

11. The process of claim 1 wherein the fluorinated surfactant is present in an amount of 1-10 parts by weight, per 100 parts by weight olefin polymer.

* * * * *